(12) United States Patent
Xu et al.

(10) Patent No.: US 12,103,092 B2
(45) Date of Patent: Oct. 1, 2024

(54) DEVICE FOR CONTROLLING DEFORMATION OF A LARGE-SCALE CRANKSHAFT

(71) Applicant: BEIJING INSTITUTE OF TECHNOLOGY, Beijing (CN)

(72) Inventors: Chunguang Xu, Beijing (CN); Yuren Lu, Beijing (CN); Peng Yin, Beijing (CN); Peilu Li, Beijing (CN); Dezhi Li, Beijing (CN); Shuangyi Li, Beijing (CN); Wenyuan Song, Beijing (CN); Zhaowei Miao, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 647 days.

(21) Appl. No.: 17/394,721

(22) Filed: Aug. 5, 2021

(65) Prior Publication Data
US 2022/0080510 A1    Mar. 17, 2022

(30) Foreign Application Priority Data
Sep. 16, 2020    (CN) .......................... 202010974875.7

(51) Int. Cl.
| | |
|---|---|
| *B24B 5/18* | (2006.01) |
| *B23B 5/18* | (2006.01) |
| *B23P 25/00* | (2006.01) |
| *B24B 1/04* | (2006.01) |
| *C21D 10/00* | (2006.01) |

(52) U.S. Cl.
CPC . *B23B 5/18* (2013.01); *B24B 1/04* (2013.01)

(58) Field of Classification Search
CPC . B23P 25/00; C21D 10/00; B23B 5/18; B24B 1/04
See application file for complete search history.

(56) References Cited

U.S. PATENT DOCUMENTS 11,753,696 B2 * 9/2023 Xu ............................ F16C 3/06
                                                                 148/508

FOREIGN PATENT DOCUMENTS

| CN | 03219437 U | 1/2003 | |
|---|---|---|---|
| CN | 201410099482 A | 6/2014 | |
| WO | WO-2004029303 A1 * | 4/2004 | ............... C21D 7/02 |

OTHER PUBLICATIONS

Machine Translation of WO 2004029303 A1 (Year: 2004).*

* cited by examiner

*Primary Examiner* — Nguyen Q. Ha
(74) *Attorney, Agent, or Firm* — John A. Miller; Shumaker, Loop & Kendrick, LLP

(57) ABSTRACT

A device for controlling deformation of a large-scale crankshaft comprising a crankshaft holder that is arranged for fixing the crankshaft so that the crankshaft is aligned with an axis; a regulatory bracket that is arranged on the crankshaft holder at a position corresponding to the crankshaft; and a high-energy acoustic beam transducer that is arranged on the bracket and is provided with an end part coupled with the crankshaft. The crankshaft is fixed through the crankshaft holder, high-energy ultrasonic waves are injected into the crankshaft by the transducer, mass points in the crankshaft are driven to vibrate along the acoustic beam direction, and machining residual stress of the crankshaft is removed through the high-energy acoustic beam to realize the regulation and control of the residual stress in the material in the specific direction, so that machining precision of the crankshaft is ensured and machining deformation of the crankshaft is reduced.

4 Claims, 2 Drawing Sheets

DEVICE FOR CONTROLLING DEFORMATION OF A LARGE-SCALE CRANKSHAFT

CROSS-REFERENCE TO RELATED APPLICATIONS

This application claims priority to China Patent Application Serial No. 202010974875.7 filed Sep. 16, 2020, the entire disclosure of which is herein incorporated by reference.

BACKGROUND

Field

The disclosure relates to the field of machining control of a large-scale crankshaft, and in particular to a device for controlling deformation of a large-scale crankshaft.

Discussion of the Related Art

The crankshaft is the most important component of an engine. It receives the force from the connecting rod and converts it into torque which is output by the crankshaft and drives other accessories of the engine. The crankshaft is subjected to the combined action of centrifugal force of the rotating mass, gas inertia force of periodic variation and reciprocating inertia force, so that the crankshaft is subjected to the action of bending and torsion loads. Therefore, the crankshaft is required to have enough strength and rigidity with a wear-resistant axle journal surface, work uniformly and have good balance. Compared with other components, the production of the large-scale crankshaft blank mainly adopts hot die forging, and the rough machining of the crankshaft widely adopts advanced equipment such as a numerical control lathe, milling machine and the like to carry out numerical control turning, internal milling and turning-broaching machining on the main journal and the connecting rod journal so as to effectively reduce the deformation of the machining of the crankshaft. The finish machining of the crankshaft adopts widely a CNC-controlled crankshaft grinder to perform finish grinding on the journal of the crankshaft. In addition, in order to ensure the machining hardness of the crankshaft, the crankshaft is required to perform surface hardening treatment by adopting intermediate frequency quenching and nitriding treatment. Thus, the machining process is complex, and the deformation is overlarge due to complex residual stress generated in the machining process.

For the machining process of the large-scale crankshaft, a machining tool still depends on foreign import, machining process parameters and the like still depend on foreign empirical values, so that machining yield of the crankshaft is low. Residual stress concentration caused by a complex machining process is the most main reason of the out-of-tolerance of machining deformation of the crankshaft. Particularly, when a machining tool is removed, the crankshaft immediately generates visible deformation after being taken down due to the action of the residual stress, and meanwhile, many failures of the crankshaft, such as stress corrosion, fatigue and the like, are closely related to the residual stress. In order to avoid the above problems such as deformation and the like, a method for controlling crankshaft machining deformation is urgently needed, which can control crankshaft deformation.

The literature search shows that the existing method for removing crankshaft machining residual stress still depends on the traditional annealing stress removing method, and no related other method for removing the residual stress is worth using for reference. In the prior art, there are many methods and devices for reducing residual stress of metal materials, such as annealing, tempering, vibration impact, etc. For example, an invention patent application (application No. 201410099482.0) entitled "Residual stress eliminating device based on high-energy acoustic and magnetic coupling principle" discloses a device for eliminating residual stress of a metal material induced during machining processes such as cutting, heat treatment, welding and the like. For another example, utility model patent (application No. 03219437.4) entitled "Portable vibrating treatment apparatus for removing residual stress of welding" discloses a device capable of remarkably eliminating the welding residual stress, improving the bearing capacity and the fatigue life of a welding structure. Both of the above-mentioned prior arts relate to devices for eliminating residual stress of a metal material, and the methods and devices used are complicated, but no description is given of the control of the machining deformation.

Therefore, a device for controlling latent deformation of a large-scale crankshaft by reducing the machining residual stress of the crankshaft more conveniently is urgently needed.

SUMMARY

In view of this, a main object of the present disclosure is to provide a device for controlling latent deformation of a large-scale crankshaft by reducing the machining residual stress of the crankshaft more conveniently.

A device for controlling deformation of a large-scale crankshaft provided by the present disclosure comprises: a crankshaft holder arranged for fixing a crankshaft so that the crankshaft is aligned with an axis; a regulatory bracket arranged on the crankshaft holder at a position corresponding to the crankshaft; and a high-energy acoustic beam transducer, arranged on the regulatory bracket and provided with an end part coupled with the crankshaft.

By adopting the above-mentioned structure, the crankshaft is fixed by the crankshaft holder, high-energy ultrasonic waves are injected into the crankshaft by the high-energy acoustic beam transducer arranged on the regulatory bracket, and mass points inside the crankshaft are driven to vibrate along the acoustic beam direction so that the residual stress in the material in the specific direction is regulated and controlled. The machining residual stress of the crankshaft is removed through the high-energy acoustic beam, so that the machining precision of the crankshaft is ensured, and the machining deformation of the crankshaft is reduced. Meanwhile, the crankshaft holder can limit the crankshaft to be aligned with the axis, and high-energy ultrasonic waves emitted by the high-energy acoustic beam transducer play a role in straightening the crankshaft.

Preferably, the crankshaft holder comprises: a mounting plate arranged horizontally; a plurality of fixing plates vertically arranged on the mounting plate and provided, at end parts of the fixing plates, with first fixing openings in an opening shape; and limiting plates arranged at the end parts of the fixing plates and provided, at positions corresponding to the first fixing openings, with second fixing openings in an opening shape, wherein the limiting plates is fixedly connected with the fixing plates so as to fix the crankshaft in the first fixing openings and the second fixing openings.

By adopting the above-mentioned structure, the specific structural form that the crankshaft holder fixes the crankshaft is provided.

Preferably, the mounting plate is provided with a plurality of T-shaped fixing grooves via which the regulatory bracket is fixed on the mounting plate through T-shaped groove bolts.

By adopting the above-mentioned structure, the regulatory bracket is fixed on the mounting plate by the fixed connection of the T-shaped groove bolts and the fixing grooves, and the position of the regulatory bracket can be adjusted at any time according to the different regulatory positions of the crankshaft.

Preferably, the regulatory bracket is provided with a mounting ring sleeved on the crankshaft, and the high-energy acoustic beam transducer is arranged on the mounting ring.

Preferably, the mounting ring includes three sections, wherein two ends of one section positioned at the lower part are respectively hinged with one ends of the other two sections, and the other ends of the other two sections are fixedly connected through bolts; each section is provided with a mounting hole for fixing the high-energy acoustic beam transducer.

Preferably, the regulatory bracket further comprises a fixing frame arranged at the lower part of the mounting ring, and the lower part of the fixing frame is fixedly connected with the crankshaft holder.

By adopting the above-mentioned structure, the specific structure of the regulatory bracket is provided, the high-energy acoustic beam transducer can be arranged around the crankshaft, and the effect of internal stress reduction is improved.

Preferably, the high-energy acoustic beam transducer comprises an exciter of which a transmitting end is connected with a horn.

By adopting the above-mentioned structure, the exciter can emit high-energy acoustic beams, and the horn can increase the vibration amplitude of ultrasonic waves emitted by the exciter, thereby improving the effect of internal stress reduction.

Preferably, a curved surface of an end part of the horn is adapted to the crankshaft.

Preferably, a coupling medium is coated between the end part of the horn and the crankshaft.

By adopting the above-mentioned structure, the ultrasonic wave loss can be reduced by using the horn adapted to the crankshaft and coating the coupling medium, and the effect of internal stress reduction is improved.

DESCRIPTION OF THE REFERENCE NUMERALS

Figure 1:
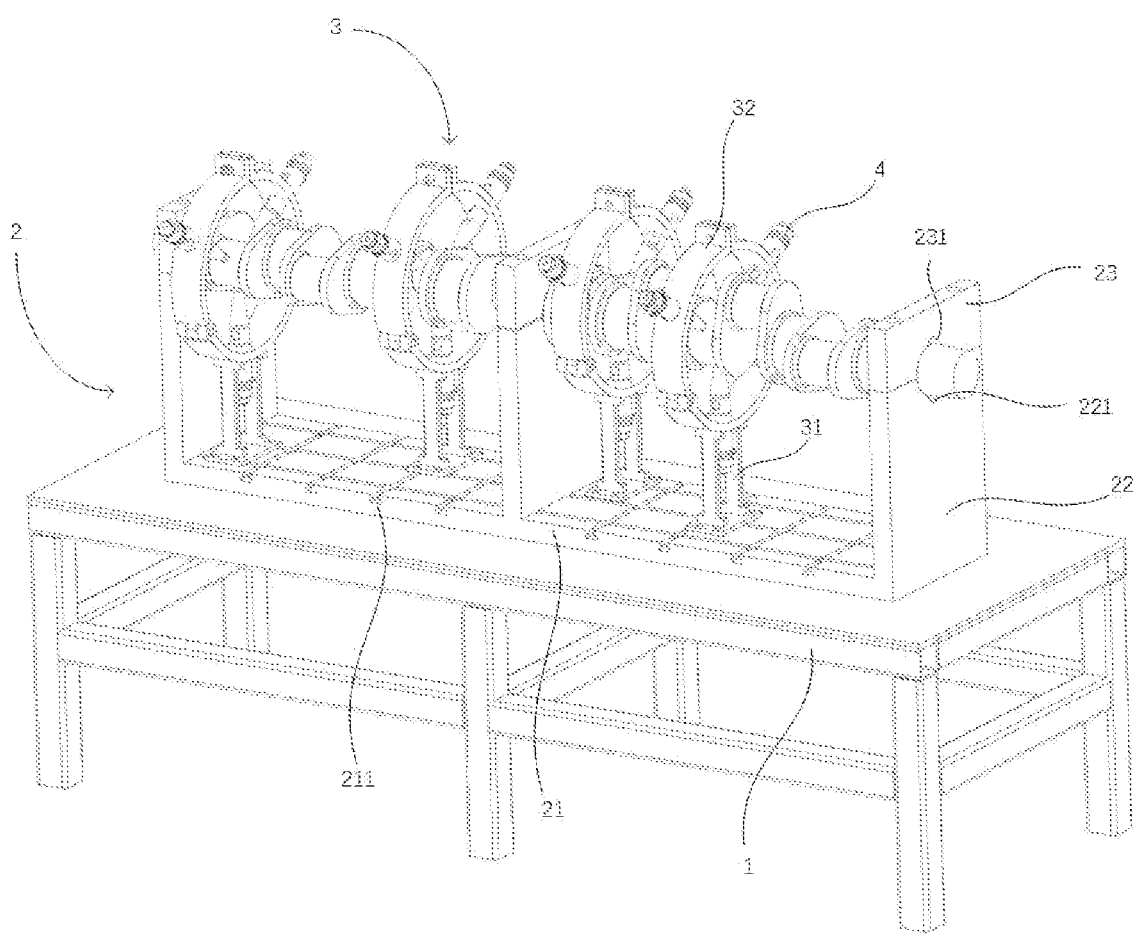
FIG. 1 is a schematic structural diagram of a device for controlling deformation of a large-scale crankshaft according to an embodiment of the present application.

A work table 1; a crankshaft holder 2; a mounting plate 21; a fixing plate 22; a first fixing opening 221; a pressing plate 23; a second fixing opening 231; a regulatory bracket 3; a fixing frame 31; a support plate 311; a connecting plate 312; a mounting ring 32; a mounting hole 321; a high energy acoustic beam transducer 4; an exciter 41; a horn 42.

DETAILED DESCRIPTION OF THE EMBODIMENTS

Next, a specific structure of a device for controlling deformation of a large-scale crankshaft according to an embodiment of the present application will be described in detail with reference to the drawings.

FIG. 1 is a schematic structural diagram of a device for controlling deformation of a large-scale crankshaft according to an embodiment of the present application. As shown in FIG. 1, the device for controlling deformation of a large-scale crankshaft includes a work table 1, a crankshaft holder 2 fixedly arranged on the work table 1 and on which a large crankshaft can be fixedly arranged, a regulatory bracket 3 fixedly arranged on the crankshaft holder 2, and a high-energy acoustic beam transducer 4 arranged on the crankshaft holder 2 and abutting against a surface of the crankshaft.

The crankshaft holder 2 includes a rectangular mounting plate 21 horizontally mounted on the work table 1 and fixing plates 22 vertically arranged in parallel at both ends and the middle position of the upper part of the mounting plate 21. The mounting plate 21 is provided with a plurality of fixing grooves 211 which are uniformly and vertically staggered. The fixing grooves 211 are inverted T-shaped grooves. The fixing plates 22 each have a first fixing opening 221 formed in a V shape and opened upward at an intermediate position of an upper end part thereof for receiving the crankshaft. Pressing plates or limiting plates 23 are arranged on the upper end parts of the fixing plates 22, and V-shaped downward-opened second fixing openings 231 are provided at positions opposite to the first fixing openings 221 at the lower portions of the pressing plates 23. The pressing plates 23 are fixed to the fixing plates 22 by screws, thereby fixing the crankshaft on the crankshaft holder 2. Meanwhile, after the crankshaft is fixed on the crankshaft holder 2, the crankshaft can be aligned to the axis of the crankshaft through the limiting effect of the pressing plate 23 and the mounting plate 21 on the crankshaft.

Figure 2:
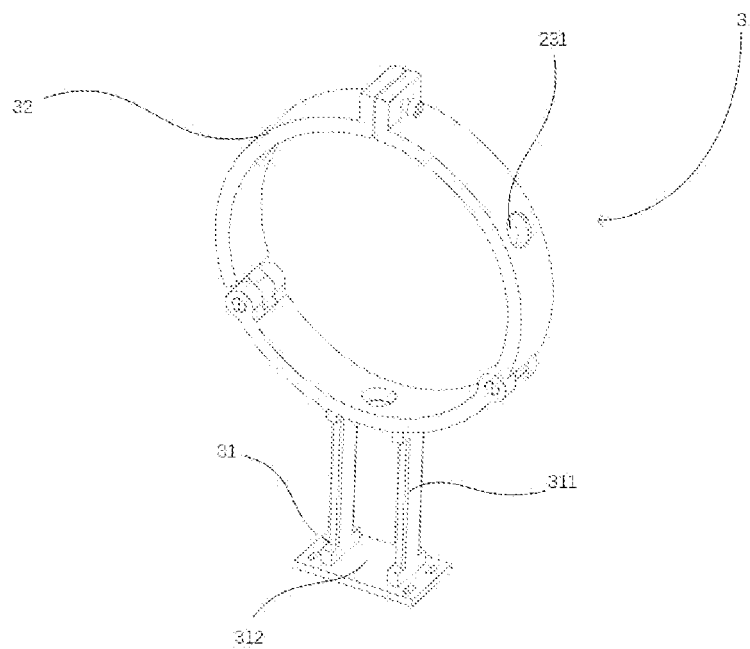
FIG. 2 is a schematic structural diagram of the regulatory bracket in FIG. 1.

FIG. 2 is a schematic structural diagram of the regulatory bracket 3 in FIG. 1. As shown in FIG. 1 and FIG. 2, the regulatory bracket 3 is disposed on the mounting plate 21, and the regulatory bracket 3 includes a fixing frame 31 and a mounting ring 32 disposed at the top end of the fixing frame 31. The fixing frame 31 is provided with two I-shaped supporting plates 311 arranged in parallel. The bottom of each supporting plate 311 is provided with a connecting plate 312, and the connecting plates 312 are fixed on the mounting plate 21 through T-shaped groove bolts. The top of the support plate 311 is fixedly attached to the bottom of the mounting ring 32. The mounting ring 32 is a circular ring-shaped component that is evenly divided into three sections, wherein two ends of one section at the lower part are respectively hinged with one ends of the other two sections, and the other ends of the other two sections are fixedly connected through bolts. The middle positions of the three sections of the mounting ring 32 are respectively provided with a mounting hole 321 for mounting the high-energy acoustic beam transducer 4.

Figure 3:
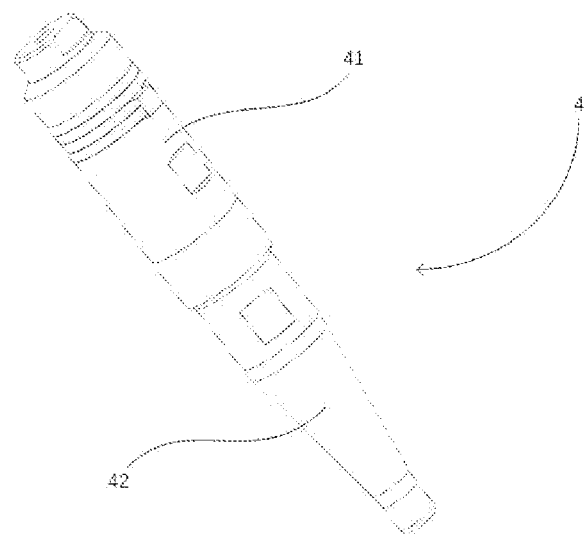
FIG. 3 is a schematic structural diagram of the high energy acoustic beam transducer in FIG. 1.

FIG. 3 is a schematic structural diagram of the high energy acoustic beam transducer 4 in FIG. 1. As shown in FIGS. 1 and 3, the high-energy acoustic beam transducer 4 includes an exciter 41 and a horn 42 disposed at the transmitting end of the exciter 41, and an end part of the horn 42 has an curved surface with the same radian as the crankshaft, so that the horn 42 can be fitted and attached to the crankshaft. The vibration amplitude of the ultrasonic waves emitted from the exciter 41 can be increased by the horn 42.

When the device is used, the stress value of the part to be regulated of the crankshaft is first detected and recorded, and the crankshaft is then fixed in the first fixing openings of the fixing plates 22 and the second fixing openings of the pressing plates, so that the crankshaft is aligned with the axis of the crankshaft. The regulatory bracket 3 is fixedly arranged on the mounting plate 21 at a position opposite to the part to be regulated of the crankshaft. The end parts of the mounting ring 32 are fixedly connected, so that the mounting ring 32 is sleeved on the crankshaft, and the part to be regulated is positioned at the circle center of the mounting ring 32. The horn 42 with the end part having the corresponding radian is selected according to the curvature of the part to be regulated and is connected with the exciter 41, and then is arranged on the mounting hole 321, so that the end part of the horn 42 is coupled with the crankshaft. A coupling medium may also be coated at the coupling position to reduce the energy loss of the high-energy acoustic wave.

After the installation is finished, the high-energy acoustic beam transducer 4 is initiated. The working frequency of the high-energy acoustic beam transducer is controlled within the range of 10-30 kHz according to the detected stress value of the part to be regulated of the crankshaft, high-energy ultrasonic waves are injected into the crankshaft, mass points inside the crankshaft are driven to vibrate along the acoustic beam direction, and the regulation and control of the residual stress in the material in a specific direction are realized. The directivity of the acoustic beam can focus the acoustic wave energy to any position on the surface and the inside of the material so that the local focusing and directional reduction and the homogenization of the residual stress in the material are realized. The predicted regulation time is set according to the stress value of the part to be regulated, and the ultrasonic transducer is closed when the predicted regulation time reaches. The crankshaft is taken down, the stress value of the part to be regulated of the crankshaft in the current process is detected and recorded again, and the stress value is compared with the stress value detected last time. If the stress value is reduced, the crankshaft is fixed again on the device for controlling deformation of a large-scale crankshaft according to the present application, and if the stress value is not changed any more, the process is ended.

The above description is only for the purpose of illustrating the preferred embodiments of the present disclosure and should not be taken as limiting the present disclosure. Any modifications, equivalents, or improvements within the spirit and principle of the disclosure should be embodied in the scope of protection of the present disclosure.

What is claimed is:

1. A device for controlling deformation of a large-scale crankshaft, comprising:
    a crankshaft holder that is arranged for fixing a crankshaft so that the crankshaft is aligned with an axis;
    a regulatory bracket that is arranged on the crankshaft holder at a position corresponding to the crankshaft; and
    a high-energy acoustic beam transducer that is arranged on the regulatory bracket and is provided with an end part coupled with the crankshaft, wherein the crankshaft holder includes a mounting plate disposed horizontally, a plurality of fixing plates vertically arranged on the mounting plate and provided, at end parts of the fixing plates, with first fixing openings in an opening shape, and limiting plates arranged at the end parts of the fixing plates and provided, at positions corresponding to the first fixing openings, with second fixing openings in an opening shape, wherein the limiting plates being fixedly connected with the fixing plates so as to fix the crankshaft in the first fixing openings and the second fixing openings.

2. The device for controlling deformation of a large-scale crankshaft according to claim 1, wherein the mounting plate is provided with a plurality of T-shaped fixing grooves via which the regulatory bracket is fixed on the mounting plate through T-shaped groove bolts.

3. A device for controlling deformation of a large-scale crankshaft, comprising:
    a crankshaft holder that is arranged for fixing a crankshaft so that the crankshaft is aligned with an axis;
    a regulatory bracket that is arranged on the crankshaft holder at a position corresponding to the crankshaft; and
    a high-energy acoustic beam transducer that is arranged on the regulatory bracket and is provided with an end part coupled with the crankshaft;
    wherein the regulatory bracket has a mounting ring sleeved on the crankshaft, and the high energy acoustic beam transducer is disposed on the mounting ring; and
    wherein the mounting ring includes three segments, wherein two ends of one segment at the lower part are respectively hinged with one ends of the other two segments, and the other ends of the other two segments are fixedly connected through a bolt; each section is provided with a mounting hole for fixing the high-energy acoustic beam transducer.

4. The device for controlling deformation of a large-scale crankshaft according to claim 3, wherein the regulatory bracket further comprises a fixing frame arranged at the lower part of the mounting ring, and a lower part of the fixing frame is fixedly connected with the crankshaft holder.

* * * * *